(12) United States Patent
Kim et al.

(10) Patent No.: US 9,888,071 B2
(45) Date of Patent: Feb. 6, 2018

(54) SYSTEM AND METHOD FOR EFFICIENT TRANSMISSION OF DATA DURING TEAM GAME IN CPNS ENVIRONMENT, AND CPNS SERVER, MOBILE COMMUNICATION TERMINAL, AND END-POINT TERMINAL FOR THE SAME

(75) Inventors: In Hwan Kim, Seoul (KR); Jeong Hoon Lee, Seoul (KR); Jeong Min You, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 1077 days.

(21) Appl. No.: 13/122,539

(22) PCT Filed: Jun. 16, 2009

(86) PCT No.: PCT/KR2009/003208
§ 371 (c)(1),
(2), (4) Date: Apr. 4, 2011

(87) PCT Pub. No.: WO2010/047458
PCT Pub. Date: Apr. 29, 2010

(65) Prior Publication Data
US 2011/0183760 A1 Jul. 28, 2011

(30) Foreign Application Priority Data
Oct. 23, 2008 (KR) .................... 10-2008-0104068

(51) Int. Cl.
*A63F 13/00* (2014.01)
*H04L 29/08* (2006.01)
(Continued)

(52) U.S. Cl.
CPC .......... *H04L 67/1095* (2013.01); *A63F 13/30* (2014.09); *H04L 67/28* (2013.01); *H04L 67/2828* (2013.01); *H04L 67/38* (2013.01)

(58) Field of Classification Search
CPC ......... H04W 4/203; H04W 4/08; H04W 4/00; A63F 13/30
(Continued)

(56) References Cited

U.S. PATENT DOCUMENTS

2004/0228356 A1* 11/2004 Adamczyk .......... H04L 12/2887
370/401
2004/0230444 A1* 11/2004 Holt ........................ G07F 17/32
370/329

(Continued)

FOREIGN PATENT DOCUMENTS

EP 1479423 A1 11/2004
EP 1619832 A2 1/2006
(Continued)

OTHER PUBLICATIONS

Japanese Office Action for application No. 2011-527735 dated Apr. 28, 2014.
(Continued)

Primary Examiner — David L Lewis
Assistant Examiner — Eric M Thomas
(74) Attorney, Agent, or Firm — Hauptman Ham, LLP

(57) ABSTRACT

A system and a method for efficiently transmitting data during a team game in a CPNS environment, and a CPNS server, a mobile communication terminal, and an end-point terminal for the same. The CPNS server stores and manages information about both the end-point terminal and the mobile communication terminal, wherein the end-point terminal communicates with the mobile communication terminal through a wireless local area network and the mobile communication terminal executes the team game through the wireless local area network, and classifies and processes
(Continued)

data to transmit only the required game-related data to the mobile communication terminal and the end-point terminal respectively.

15 Claims, 6 Drawing Sheets

(51) Int. Cl.
   *H04L 29/06* (2006.01)
   *A63F 13/30* (2014.01)
(58) Field of Classification Search
   USPC .................................................. 463/40–42
   See application file for complete search history.

(56) References Cited

U.S. PATENT DOCUMENTS

| | | |
|---|---|---|
| 2004/0235568 A1 | 11/2004 | Kim |
| 2007/0233585 A1* | 10/2007 | Ben Simon ............ G06Q 40/00 705/35 |

FOREIGN PATENT DOCUMENTS

| | | |
|---|---|---|
| JP | 03136430 | 6/1991 |
| JP | 2005340983 | 12/2005 |
| JP | 2008200523 | 9/2008 |
| KR | 20020035530 | 5/2002 |
| KR | 1020080059877 | 7/2008 |
| WO | 2007091791 | 8/2007 |

OTHER PUBLICATIONS

International Search Report dated Jan. 29, 2010 for PCT/KR2009/003208.
Open Mobile Alliance, Converged Personal Network Service Core Technical specification, Oct. 25, 2010, pp. 1-31, XP002738863.
European Search Report in connection with the counterpart European Patent Application No. 09822134.4 dated Apr. 23, 2015.

* cited by examiner

| Header Length | Length/ Destination of A | Data A | Length/ Destination of B | Data B | Length/ Destination of C | Data C | others |

| Header Length | Length/ Destination of A | Data A | Length/ Destination of C | Data C | others |

| Header Length | Length/ Source of A | Data A | Length/ Source of B | Data B | Length/ Source of C | Data C | others |

SYSTEM AND METHOD FOR EFFICIENT TRANSMISSION OF DATA DURING TEAM GAME IN CPNS ENVIRONMENT, AND CPNS SERVER, MOBILE COMMUNICATION TERMINAL, AND END-POINT TERMINAL FOR THE SAME

CROSS REFERENCE TO RELATED APPLICATION

This application claims the priority of Korean Patent Application No. 10-2008-0104068, filed on Oct. 23, 2008 in the KIPO (Korean Intellectual Property Office), the disclosure of which is incorporated herein in their entirety by reference. Further, this application is the National Phase application of International Application No. PCT/KR2009/003208, filed Jun. 16, 2009, which designates the United States and was published in Korean. Each of these applications is hereby incorporated by reference in their entirety into the present application.

TECHNICAL FIELD

The present invention relates to a system and a method for efficiently transmitting data during a team game in a CPNS (Converged Personal Network Service) environment, and a CPNS server, a mobile communication terminal, and an end-point terminal for the same. More specifically, the invention relates to a system and a method for efficiently transmitting data during a team game in a CPNS environment, which classify data that will be transmitted to a mobile communication terminal and an end-point terminal when a team game is executed between the mobile communication terminal and the end-point terminal through a wireless local area network to improve data transmission efficiency, and a CPNS server, a mobile communication terminal, and an end-point terminal for the same.

BACKGROUND ART

With the development of information communication technologies, a variety of end-point terminals capable of playing documents, images and videos, such as MP3 (Mpeg audio layer-3) player, PMP (Personal Multimedia Player), UMPC (Ultra Mobile Personal Computer), are used.

These end-point terminals download user's desired contents from personal computers and play the downloaded contents. However, it is impossible to download desired contents when a user is moving or the end-point terminal of the user cannot be linked to a PC.

To solve this problem, a technique of adding communication means connectable to a local area network, such as Bluetooth and UWB (UltraWideBand), to the end-point terminal was proposed.

According to this technique, it is possible to download contents from an external device through a local area network. However, this technique cannot download contents that are not stored in the external device even though the user wants the contents.

Furthermore, it is impossible to directly receive contents or services that were provided to mobile communication terminals from service providers or mobile telecommunication companies using the existing cellular communication even though a wireless local area network is used.

DISCLOSURE

Technical Problem

Accordingly, the present invention has been made in view of the above-mentioned problems occurring in the prior art, and it is a primary object of the present invention to provide a CPNS scheme capable of connecting an end-terminal such as PMP to a mobile communication terminal through a wireless local area network and receiving a desired service from the existing contents service provider in such manner that the end-point terminal accesses the contents service provider through the cellular communication function of the mobile communication terminal.

Meantime, a mobile communication terminal receives game data from a game providing server and transmits the game data to an end-point terminal when a team game is executed between the mobile communication terminal and the end-point terminal through a wireless local area network in a CPNS environment. Here, the terminal in game unnecessarily receives game data of the other terminal even when the game data is not needed in many cases.

The present invention has been made in view of the above-mentioned problem, and it is an object of the present invention to provide a system and a method for efficiently transmitting data during a team game in a CPNS environment and a CPNS server for the same, which classify destinations of game-related data provided during a team game executed between a mobile communication terminal and an end-point terminal through a wireless local area network.

It is another object of the present invention to provide a mobile communication terminal for selectively receiving game-related data provided from a CPNS server.

It is yet another object of the present invention to provide an end-point terminal capable of indicating the source of game-related data when transmitting the game-related data to a CPNS server to discriminate the game-related data from data transmitted from another terminal.

Technical Solution

According to an aspect of the present invention, there is provided a system for efficiently transmitting data during a team game in a CPNS environment, which comprises a CPNS server configured to store and manage information about both an end-point terminal and a mobile communication terminal, wherein the end-point terminal communicates with the mobile communication terminal through a wireless local area network and the mobile communication terminal executes the team game through the wireless local area network, classify and process data to transmit only the required game-related data to the mobile communication terminal and the end-point terminal respectively, and transmit the game-related data to the mobile communication terminal; the mobile communication terminal extracting the data allocated thereto from the game-related data transmitted from the CPNS server while executing the team game with the end-point terminal through the wireless local area network and transmitting the data destined for the end-point terminal, to the end-point terminal; and the end-point terminal executing the game-related data transmitted from the mobile communication terminal, and when transmitting game-related data to the CPNS server, classifying and processing the data, and then transmitting the data to the mobile communication terminal.

The mobile communication terminal may merge data, which will be transmitted from the mobile communication terminal to the CPNS server, with the game-related data transmitted from the end-point terminal, indicate the source of the data and transmit the merged data to the CPNS server.

The CPNS server may classify the data into data required for both the mobile communication terminal and the end-point terminal, data required to be transmitted to only the mobile communication terminal, and data required to be transmitted to only the end-point terminal.

The end-point terminal may classify the game-related data into the data allocated thereto and the data corresponding to both the mobile communication terminal and the end-point terminal when transmitting the game-related data to the CPNS server.

According to another aspect of the present invention, there is provided a CPNS server connected to a mobile communication terminal to transmit game-related data to a terminal executing a team game through a wireless local area network, the CPNS server comprising a communication interface configured to communicate with a mobile communication network; a contents request unit configured to request a contents providing server to provide the game-related data that will be transmitted to the mobile communication terminal executing the team game with the end-point terminal through the wireless local area network and receive the game-related data; a data classifying/processing unit configured to classify the game-related data that will be transmitted to the mobile communication terminal into data required for both the mobile communication terminal and the end-point terminal, data required to be transmitted to only the mobile communication terminal, and data required to be transmitted to only the end-point terminal; a data transmitter configured to transmit the game-related data classified by the data classifying/processing unit to the mobile communication terminal; and a database configured to store information about the mobile communication terminal, information about the end-point terminal and information about the CPNS server.

The CPNS server may further comprise a mobile communication terminal information manager configured to register the information about the mobile communication terminal communicating with the end-point terminal through the wireless local area network in the database and manages the information.

The CPNS server may further comprise an end-point terminal information manager configured to register the information about the end-point terminal transmitting/receiving information to/from the mobile communication terminal through the wireless local area network in the database and manage the information.

According to another aspect of the present invention, there is provided a mobile communication terminal connected to a CPNS server and an end-point terminal through a wireless local area network to selectively receive game-related data transmitted from the CPNS server, the mobile communication terminal comprising a data extractor configured to extract only game-related data destined for the mobile communication terminal from the game-related data classified by destinations corresponding to at least one of the mobile communication terminal and the end-point terminal when receiving the game-related data from the CPNS server; and a data transmitting/receiving unit configured to transmit/receive information to/from the CPNS server or the end-point terminal through the wireless local area network and transmit the game-related data destined for the end-point terminal, to the end-point terminal.

The mobile communication terminal may further comprise a data merging unit configured to merge data indicating the mobile communication terminal as the source with the game-related data indicating the end-point terminal as the source when receiving the game-related data from the end-point terminal and transmit the merged data to the CPNS server through the data transmitting/receiving unit.

According to another aspect of the present invention, there is provided an end-point terminal for transmitting/receiving data to/from a mobile communication terminal while executing a team game with the mobile communication terminal through a wireless local area network, the end-point terminal comprising a communication interface configured to communicate with the wireless local area network; an input unit configured to receive a signal according to a user's choice; a data transmitting/receiving unit configured to transmit/receive game-related data to/from the mobile communication terminal through the communication interface; a data classifying/processing unit configured to classify the sources of game-related data, which will be transmitted to a CPNS server providing game-related data, into the end-point terminal, and the mobile communication terminal and the end-point terminal, indicates the sources, and transmit the game-related data to the mobile communication unit through the data transmitting/receiving unit when the end-point terminal transmits the game-related data to the CPNS server via the mobile communication terminal; a playing unit configured to execute contents; and a storage unit configured to store information about the end-point terminal.

According to another aspect of the present invention, there is provided a method for efficiently transmitting data during a team game in a system including a CPNS server, a mobile communication terminal and an end-point terminal, the method comprising a step (a) in which the CPNS server classifies and processes data to respectively transmit only the required game-related data to the mobile communication terminal and the end-point terminal, which execute the team game through a wireless local area network, and transmits the game-related data to the mobile communication terminal; a step (b) in which the mobile communication terminal extracts the data allocated thereto from the game-related data transmitted from the CPNS server and transmits the data destined for the end-point terminal, to the end-point terminal; and a step (c) in which the end-point terminal executes the game-related data transmitted from the mobile communication terminal.

The method may further comprise a step in which the end-point terminal classifies the sources of the game-related data into the end-point terminal, and the mobile communication terminal and the end-point terminal, indicates the sources, and then transmits the data to the mobile communication terminal when transmitting the game-related data to the CPNS server; and a step in which the mobile communication terminal merges data indicating the mobile communication terminal as the source with the game-related data transmitted from the end-point terminal and transmits the data to the CPNS server after the step (c).

According to another aspect of the present invention, there is provided a method for transmitting game-related data from a CPNS server connected to a mobile communication terminal to an end-point terminal executing a team game through a wireless local area network, the method comprising a step (a) in which the CPNS server requests a contents providing server to provide the game-related data that will be transmitted to the mobile communication terminal executing the team game with the end-point terminal through the wireless local area network and requests the game-related data; a step (b) in which the CPNS server classifies the game-related data that will be transmitted to the mobile communication terminal into data required for both the mobile communication terminal and the end-point terminal, data required to be transmitted to only the mobile communication terminal and data required to be transmitted to only the end-point terminal; and a step (c) in which the CPNS server transmits the game-related data classified in the step (b) to the mobile communication terminal.

According to another aspect of the present invention, there is provided a method for selectively receiving game-related data from a CPNS server through a mobile communication terminal connected to the CPNS server and an end-point terminal, the method comprising a step (a) in which the mobile communication terminal requests the CPNS server to provide data while executing a team game with the end-point terminal through a wireless local area network; a step (b) in which the mobile communication terminal extracts only the data allocated thereto from the game-related data transmitted from the CPNS server; and a step (c) in which the mobile communication terminal transmits the data destined for the end-point terminal, to the end-point terminal.

The method may further comprise a step in which the mobile communication terminal merges data indicating the mobile communication terminal as the source with the game-related data transmitted from the end-point terminal and transmits the merged data to the CPNS server after the step (c).

According to another aspect of the present invention, there is provided a method for transmitting/receiving data from/to an end-point terminal executing a team game with a mobile communication terminal through a wireless local area network, the method comprising a step (a) in which the end-point terminal classifies game-related data by sources corresponding to the end-point terminal, and the end-point terminal and the mobile communication terminal, and indicates the sources when transmitting the game-related data to a CPNS server providing game-related data via the mobile communication terminal; and a step (b) in which the end-point terminal transmits the game-related data classified in the step (a) to the mobile communication terminal.

Advantageous Effects

As described above, the system and method for efficiently transmitting data during a team game in a CPNS environment and the CPNS server for the same according to the present invention classify the destinations of game-related data provided during a team game executed between a mobile communication terminal and an end-point terminal through a wireless local area network, and thus the reception of unnecessary replicated data at the terminal in game is prevented. Accordingly, data transmission can be performed more efficiently.

Furthermore, the mobile communication terminal according to the present invention can extract and selectively receive only necessary data from game-related data provided from the CPNS server.

In addition, the end-point terminal of the present invention indicates the source of game-related data when transmitting the game-related data to the CPNS server, and thus a server providing the game-related data can distinguish the game-related data transmitted from the end-point terminal from data transmitted from another terminal to smoothly provide the game-related data.

According to the present invention, mobile telecommunication companies or contents service providers can extend service ranges limited to mobile communication terminals to various application terminals (end-point terminals). Therefore, the frequency of use of contents and profits can be enhanced.

DESCRIPTION OF DRAWINGS

Further objects and advantages of the invention can be more fully understood from the following detailed description taken in conjunction with the accompanying drawings, in which.

DESCRIPTION ON REFERENCE NUMERALS

Figures 1, 2, 3, 4:
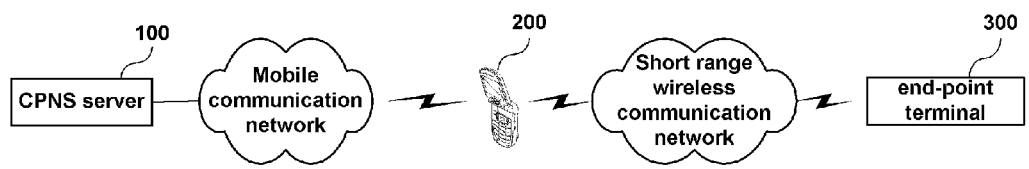
FIG. 1 illustrates connections of a system according to the present invention and communication networks.
FIG. 2 illustrates an exemplary data format structure according to the present invention.
FIG. 3 illustrates another exemplary data format structure according to the present invention.
FIG. 4 illustrates another exemplary data format structure according to the present invention.

100: CPNS server
110,310: Communication interface
120: Mobile communication terminal information manager
130: End-point terminal information manager
140: Contents request unit
150,340: Data classifying/processing unit
160: Data transmitter
170: Database
200: Mobile communication terminal
210: RF communication unit
220,320: Input unit
230: Output unit
240,360: Storage unit
250,330: Data transmitting/receiving unit
260: Data extractor
270: Data merging unit
300: End-point terminal
350: playing unit

BEST MODE

A CPNS (Converged Personal Network Service) environment disclosed in the present invention allows a mobile terminal that can perform only near field communication and cannot use cellular communication through a mobile communication network to carry out near field communication with a mobile communication terminal functioning as a PN (Personal Network service) gateway to use a data service that can be provided through the cellular communication. In the present invention, an end-point terminal capable of performing near field communication can use a mobile game service through near field communication with a mobile communication terminal in the CPNS environment.

Preferred embodiments of the present invention will now be explained in detail with reference to the attached drawings.

FIG. 1 illustrates connections of a system according to the present invention and communication networks.

A system for efficiently transmitting data during a team game in a CPNS environment includes a CPNS server 100 which stores and manages information about an end-point terminal 300 and a mobile communication terminal 200, wherein the end-point terminal 300 communicates with the mobile communication terminal 200 through a wireless local area network and the mobile communication terminal 200 executes the team game through the wireless local area network, and classifies and processes data to transmit only the required game-related data to the mobile communication terminal 200 and the end-point terminal 300 respectively, the mobile communication terminal 200 extracting the data allocated thereto from the game-related data transmitted from the CPNS server 100 while executing the team game with the end-point terminal 300 through the wireless local area network and transmitting the data (shown in FIG. 3) destined for the end-point terminal 300 to the end-point terminal 300, and the end-point terminal 300 executing the game-related data transmitted from the mobile communication terminal 200, and when transmitting the game-related data to the CPNS server 100, classifying and processing the data, and then transmitting the data to the mobile communication terminal 200.

Here, the CPNS server 100 classifies the data into data (Data A shown in FIG. 2) required for both the mobile communication terminal and the end-point terminal, data (Data B shown in FIG. 2) required to be transmitted to only the mobile communication terminal, and data (Data C shown in FIG. 2) required to be transmitted to only the end-point terminal, as shown in FIG. 2.

Furthermore, the CPNS server 100 requests a contents providing server (not shown) to provide contents matched to specifications (for example, specification information including LCD size and Codec information, capabilities, etc.) of the mobile communication terminal and the end-point terminal with reference to the specifications and receives the contents. Here, the contents providing server may change the original of the contents according to the specifications of the mobile communication terminal. If the contents providing server transmits the original contents to the CPNS server 100, the CPNS server 100 changes the original contents to suit the specifications of the mobile communication terminal and the end-point terminal.

The mobile communication terminal 200 merges data, which will be transmitted from the mobile communication terminal 200 to the CPNS server, with the game-related data transmitted from the end-point terminal, indicates the source of the data, as shown in FIG. 4, and then transmits the data to the CPNS server 100.

The end-point terminal 300 classifies the game-related data into data allocated thereto and data commonly allocated to the end-point terminal and the mobile communication terminal when transmitting the game-related data to the CPNS server 100.

The end-point terminal 300 shown in FIG. 1 is a mobile terminal having a near field communication function, such as PMP, MP3 players, automobile navigation terminals, cellular phones, video game consoles, etc.

The wireless local area network can includes any communication network available for near field communication, such as wireless LAN, Bluetooth, UWB, WPAN (wireless Personal Area Networks), etc.

In FIGS. 2, 3 and 4, Data A represents information required for both the mobile communication terminal and the end-point terminal, Data B represents information required to be transmitted to only the mobile communication terminal and Data C represents information required to be transmitted to only the end-point terminal.

The CPNS server 100, the mobile communication terminal 200 and the end-point terminal 300 shown in FIG. 1 go through an initialization process for the CPNS service, which will now be described.

Figure 5:
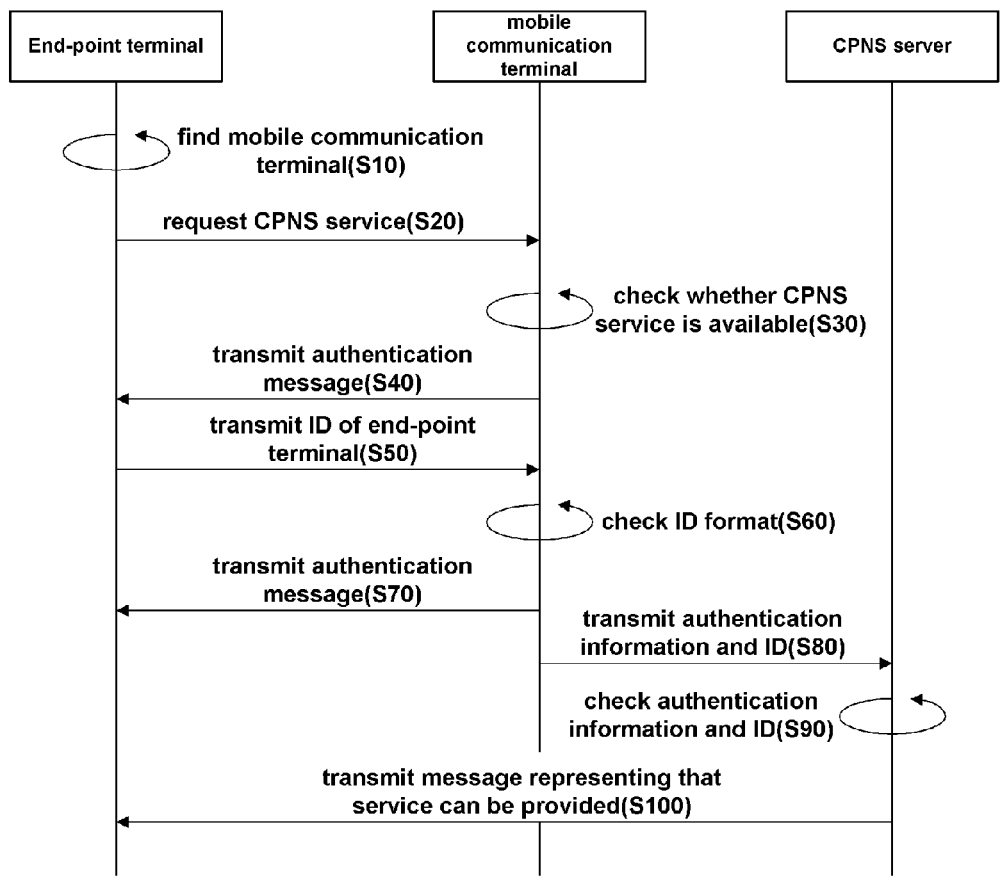
FIG. 5 is a flowchart illustrating an initialization method for CPNS service according to the present invention.

FIG. 5 is a flowchart illustrating an initialization method for the CPNS service according to the present invention.

Referring to FIG. 5, the end-point terminal 300 finds a mobile communication terminal that will function as a PN gateway device to use the CPNS service in step S10.

Then, the end-point terminal 300 requests the mobile communication terminal 200, found in step S10, to provide the CPNS service in step S20. In this step, the end-point terminal transmits information representing that the end-point terminal is available for the CPNS service to the mobile communication terminal.

The mobile communication terminal 200 checks whether the end-point terminal is available for the CNPS service when receiving the request for the CPNS service from the end-point terminal in step S30.

If the mobile communication terminal determines that the end-point terminal is available for the CPNS service in step S30, the mobile communication terminal 200 transmits an acknowledgement message representing that the CPNS service can be provided to the end-point detector 300 in step S40.

The end-point terminal 300 transmits the ID to the mobile communication terminal when receiving the acknowledgement message from the mobile communication terminal in step S50.

The mobile communication terminal 200 checks whether the format of the ID transmitted from the end-point terminal 300 corresponds to an ID format issued by CPNS, and when the formats correspond to each other, transmits an acknowledgement message representing that the CPMS service can be provided to the end-point terminal 300 in steps S60 and S70.

Then, the mobile communication terminal 200 transmits authentication information and IDs of the mobile communication terminal 200 and the end-point terminal 300 to the CPNS server 100 in step S80.

The CPNS server 100 checks the authentication information and IDs transmitted from the mobile communication terminal to determine whether the mobile communication terminal and the end-point terminal are available for the CPNS service in step S90.

If both the mobile communication terminal and the end-point terminal are available for the CPNS service, the CPNS server 100 notifies the end-point terminal that both the two terminals are available for the CPNS service to allow the end-point terminal to use the CPNS service including requesting for contents in step S100.

If any one of the mobile communication terminal and the end-point terminal is not available for the CPNS service, the CPNS server 100 notifies the end-point terminal of this fact and ends the service.

If the end-point terminal is not available for the CPNS service in step S30, the mobile communication terminal 200 transmits a message representing that the CPNS service cannot be provided to the end-point terminal 300, and then finishes the service.

If the format of the ID of the end-point terminal is not matched to the ID format issued by the CPNS in step S60, the mobile communication terminal 200 transmits a message representing that the CPNS service cannot be provided to the end-point terminal 300, and then ends the service.

The CPNS server 100 stores terminal information including specifications (for example, LCD size, Codec information, etc.) of the end-point terminal 300 provided with the CPNS service through near field communication with the mobile communication terminal 200 and terminal information about the mobile communication terminal 200 and refers to the stored information when providing the CPNS service.

For example, when the CPNS server 100 requests the contents providing server (not shown) to provide contents, the CPNS server 100 requests the contents based on the specifications of the end-point terminal 300 or the mobile communication terminal 200.

Figure 6:
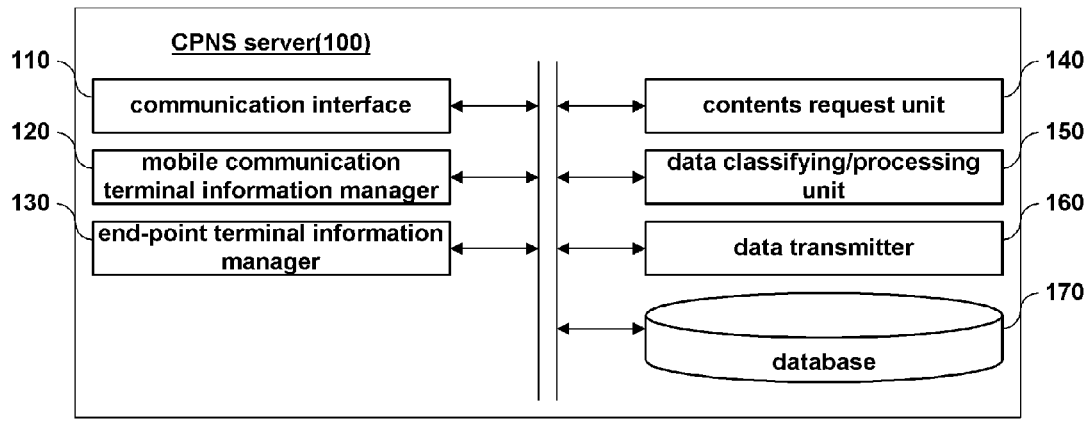
FIG. 6 illustrates a configuration of a CPNS server according to the present invention.

FIG. 6 illustrates a configuration of the CPNS server 100 according to the present invention.

Referring to FIG. 6, the CPNS server 100 includes a communication interface 110, a mobile communication terminal information manager 120, an end-point terminal information manager 130, a contents request unit 140, a data classifying/processing unit 150, a data transmitter 160, and a database 170.

More specifically, the communication interface 110 is configured to communicate with a mobile communication network.

The mobile communication terminal information manager 120 registers information about the mobile communication terminal 200 communicating with the end-point terminal 300 through a wireless local area network in the database 170 and manages the registered information.

The end-point terminal information manager 130 registers information about the end-point terminal 300 transmitting/receiving information to/from the mobile communication terminal 200 through the wireless local area network in the database 170 and manages the registered information.

The contents request unit 140 requests the contents providing server (not shown) to provide game-related data that will be transmitted to the mobile communication terminal 200 executing a team game with the end-point terminal through the wireless local area network and receives the game-related data from the contents providing server (not shown). Here, the contents providing server (not shown) may change the original of the contents according to the specification of the mobile communication terminal.

IF the contents providing server (not shown) transmits the original contents to the CPNS server 100, the CPNS server 100 changes the original contents to suit the specifications of the mobile communication terminal. In this case, the CPNS server 100 may include an additional configuration for changing contents to suit the specifications of the mobile communication terminal.

The data classifying/processing unit 150 classifies game-related data that will be transmitted to the mobile communication terminal 200 into data required for both the mobile communication terminal and the end-point terminal, data required to be transmitted to only the mobile communication terminal and data required to be transmitted to only the end-point terminal.

The transmitter 160 transmits the game-related data classified by the data classifying/processing unit 150 to the mobile communication terminal 200.

The database 170 stores information about the CPNS server 100, information about the mobile communication terminal 200 and information about the end-point terminal 300.

Figure 7:
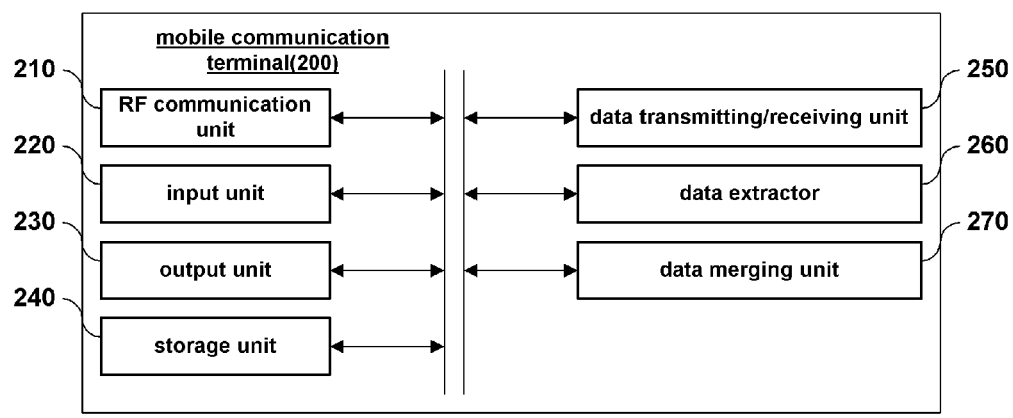
FIG. 7 illustrates a configuration of a mobile communication terminal according to the present invention.

FIG. 7 illustrates a configuration of the mobile communication terminal 200 according to the present invention.

Referring to FIG. 7, the mobile communication terminal 200 includes an RF communication unit 210, an input unit 220, an output unit 230, a storage unit 240, a data transmitting/receiving unit 250, a data extractor 260, and a data merging unit 270.

The RF communication unit 210 performing wireless communication with a wireless local area network or a mobile communication network, the input unit 220 for input control, the output unit 230 aurally or visually providing data required when a voice call service or data service is used and the storage unit 240 storing data are general components of the mobile communication terminal so that detailed explanations thereof are omitted.

The data transmitting/receiving unit 250 transmits/receives data to/from the CPNS server 100 or the end-point terminal 200 through a wireless local area network and transmits game-related data destined for the end-point terminal, to the end-point terminal 300.

The data extractor 260 extracts only game-related data destined for the mobile communication terminal 200 from game-related data classified by destinations corresponding to at least one of the mobile communication terminal 200 and the end-point terminal 300 when receiving the game-related data from the CPNS server 100.

For example, if the game-related data transmitted from the CPNS server 100 has the format structure shown in FIG. 2 (Data A: information required for both the mobile communication terminal and the end-point terminal, Data B: information required to be transmitted to only the mobile communication terminal, Data C: information required to be transmitted to only the end-point terminal), the data extractor 260 extracts only Data A and Data B destined for the mobile communication terminal 200.

The data transmitting/receiving unit 250 transmits the game-related data destined for the end-point terminal 300 (including Data A and Data C), which has the data format shown in FIG. 3, to the end-point terminal 300.

The data merging unit 270 merges data having the mobile communication terminal 200 as the source with the game-related data destined for the end-point terminal 300 when receiving the game-related data destined for the end-point terminal 300, from the end-point terminal 300 and transmits the merged data to the CPNS server 100 through the data transmitting/receiving unit 250.

Here, the format of the game-related data merged by the data merging unit 270 includes a header, length/source of data, and data contents, as shown in FIG. 4.

Figure 8:
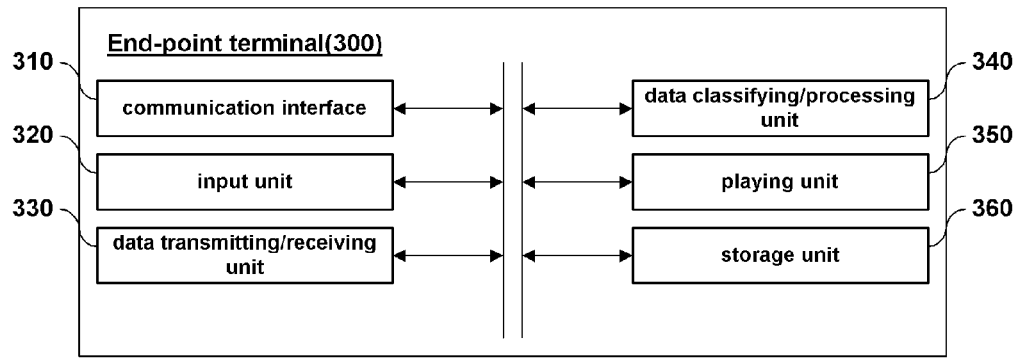
FIG. 8 illustrates a configuration of an end-point terminal according to the present invention.

FIG. 8 illustrates a configuration of the end-point terminal 300 according to the present invention.

Referring to FIG. 8, the end-point terminal 300 includes a communication interface 310, an input unit 320, a data transmitting/receiving unit 330, a data classifying/processing unit 340, a playing unit 350 and a storage unit 360.

More specifically, the communication interface 310 is configured to communicate with a wireless local area network.

The input unit 320 receives a signal according to a user's choice.

The data transmitting/receiving unit 330 transmits/receives game-related data to/from the mobile communication terminal 200 through the communication interface 310.

When the end-point terminal 300 transmits the game-related data to the CPNS server 100 providing game-related data via the mobile communication terminal 200, the data classifying/processing unit 340 classifies the sources of the game-related data, indicates the sources and transmits the data to the mobile communication terminal 200 through the data transmitting/receiving unit 330.

The playing unit 350 executes contents (for example, game-related data).

The storage unit 360 stores information about the end-point terminal 300.

Figure 9:
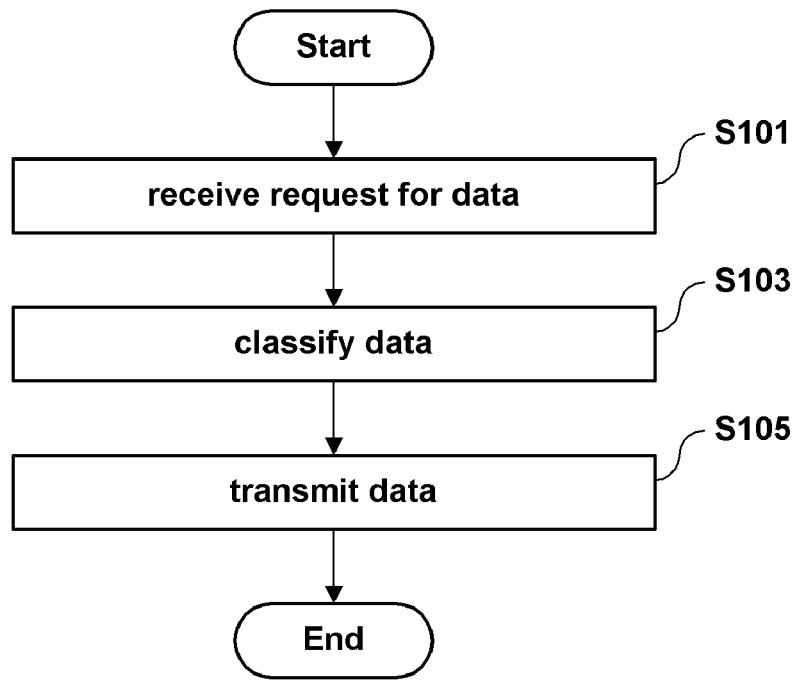
FIG. 9 is a flowchart illustrating a method of transmitting data from the CPNS server according to the present invention.

FIG. 9 is a flowchart illustrating a method of transmitting data from the CPNS server 100 according to the present invention, which shows an exemplary case that the CPNS server 100 connected to the mobile communication terminal 200 efficiently transmits game-related data to a terminal executing a team game through a wireless local area network.

The contents request unit 140 of the CPNS server 100 requests a contents providing server (not shown) to provide the game-related data that will be transmitted to the mobile communication terminal 200 executing a team game with the end-point terminal 300 through a wireless local area network and receives the game-related data when receiving a request of the mobile communication terminal 200 for the game-related data in step S101.

Here, the contents request unit 140 requests the contents providing server (not shown) to provide contents matched to the specifications of the mobile communication terminal 200 and the end-point terminal 300 with reference to the specifications of the mobile communication terminal 200 and the end-point terminal 300 and receives the contents. The contents providing server (not shown) may change the original of the contents based on the specifications of the mobile communication terminal. If the contents providing server (not shown) transmits the original contents to the CPNS server 100, the CPNS server 100 changes the original contents to suit the specifications of the mobile communication unit 200.

The data classifying/processing unit 150 classifies the game-related data that will be transmitted to the mobile communication terminal 200 into data required for both the mobile communication terminal 200 and the end-point terminal 300, data required to be transmitted to only the mobile communication terminal 200 and data required to be transmitted to only the end-point terminal 300 in step S103.

That is, the data classifying/processing unit 150 classifies and processes the game-related data to transmit only the required game-related data to the mobile communication terminal and the end-point terminal respectively.

Subsequently, the data transmitter 160 transmits the game-related data classified in step S103 to the mobile communication terminal 200 in step S105.

Figure 10:
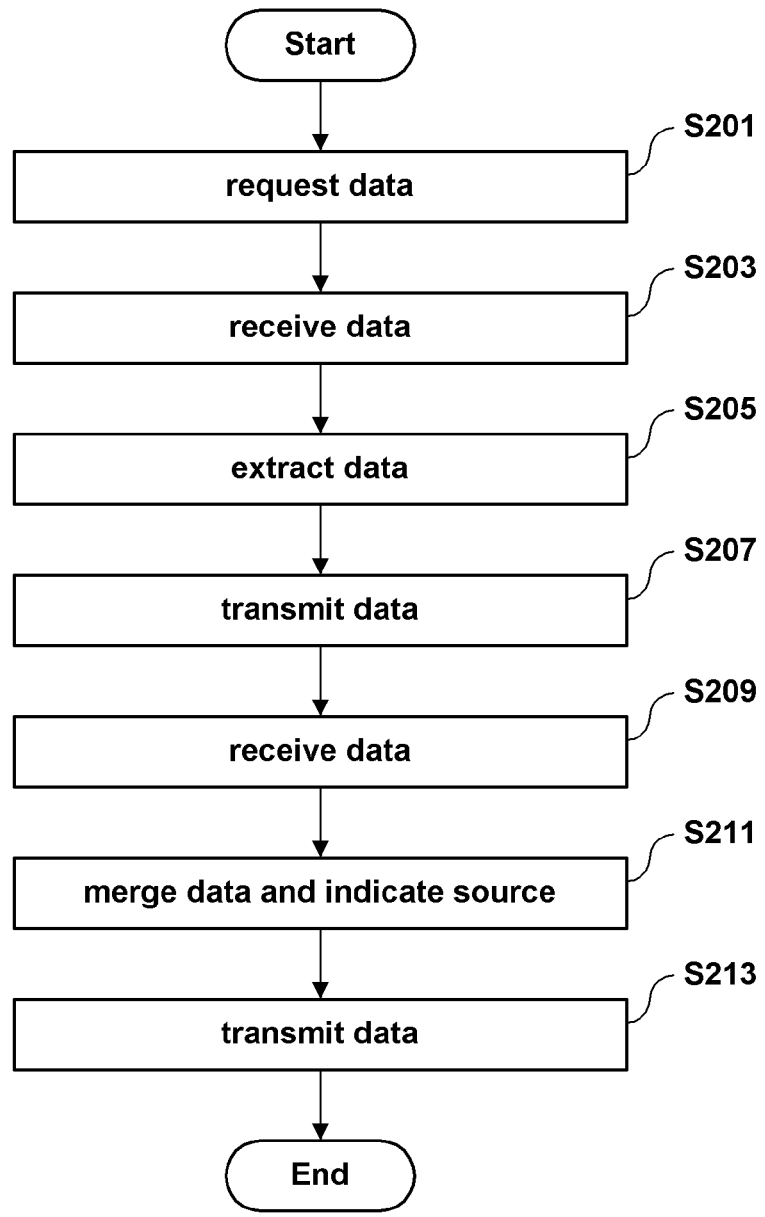
FIG. 10 is a flowchart illustrating a method of transmitting data from the mobile communication terminal according to the present invention.

FIG. 10 is a flowchart illustrating a method of transmitting data from the mobile communication terminal 200 according to the present invention, which shows an exemplary case that the mobile communication terminal 200 connected to the CPNS server 100 and the end-point terminal 300 through the wireless local area network selectively receives game-related data transmitted from the CPNS server.

The mobile communication terminal 200 requests the CPNS server 100 to provide the game-related data while executing a team game with the end-point terminal through the wireless local area network in step S201.

The mobile communication terminal 200 extracts only the data allocated thereto from the game-related data transmitted from the CPNS server 100 in steps S203 and S205.

The mobile communication terminal 200 transmits the data destined for the end-point terminal, to the end-point terminal 300 in step S207.

The mobile communication terminal 200 merges data having the mobile communication terminal 200 as the source with the game-related data transmitted from the end-point terminal 300 and transmits the data to the CPNS server in steps S209, S211 and S213.

Figure 11:
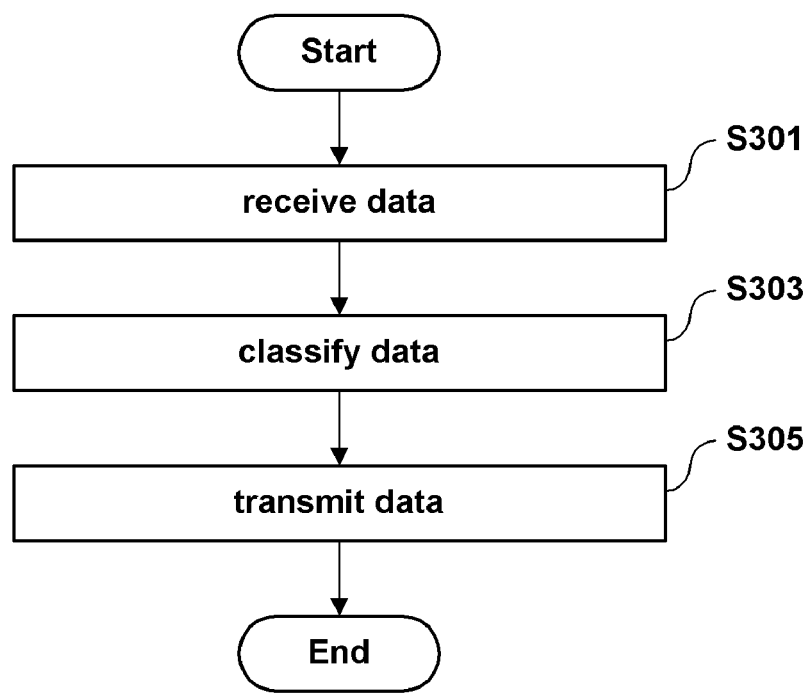
FIG. 11 is a flowchart illustrating a method of transmitting data from the end-point terminal according to the present invention.

FIG. 11 is a flowchart illustrating a method of transmitting data from the end-point terminal 300 according to the present invention, which shows an exemplary case that the end-point terminal 300 transmits and receives data while executing a team game with the mobile communication terminal 200 through the wireless local area network.

The end-point terminal 300 executes the game-related data received from the mobile communication terminal 200 in step S301 and when transmitting the game-related data to the CPNS server 100 via the mobile communication terminal 200, classifies the game-related data by sources, that is, the end-point terminal 300, and the mobile communication terminal 200 and the end-point terminal 300, and indicates the sources in step S303.

The end-point terminal 300 transmits the game-related data classified in step S303 to the mobile communication terminal 200 in step S305.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

The system and method for efficiently transmitting data during a team game in a CPNS environment, and the CPNS server, the mobile communication terminal, and the end-point terminal for the same according to the present invention can prevent the reception of unnecessary replicated data at the terminal in game as a result of classifying the destinations of the game-related data provided during the team game between the mobile communication terminal and the end-point terminal through a wireless local area network. Therefore, the present invention can perform data transmission more efficiently.

The invention claimed is:

1. A system for efficiently transmitting data during a game in a Converged Personal Network Service (CPNS) environment, the system comprising:
 a CPNS server comprising a first processor, the first processor configured to store and manage information about both an end-point terminal and a mobile communication terminal, wherein the end-point terminal communicates with the mobile communication terminal through a wireless local area network and the mobile communication terminal executes the game through the wireless local area network, and classify and process first data in order to transmit only required game-related data to the mobile communication terminal and the end-point terminal respectively, and transmit the classified game-related data to the mobile communication terminal via a mobile communication network;

the mobile communication terminal comprising a second processor, the second processor configured to receive the classified game-related data via the mobile communication network and extract game-related data allocated thereto from the classified game-related data transmitted from the CPNS server while executing the game with the end-point terminal through the wireless local area network and transmit the game-related data allocated for the end-point terminal, to the end-point terminal via the wireless local area network; and the end-point terminal comprising a third processor, the third processor configured to execute the game-related data transmitted from the mobile communication terminal, and classify and process second data executed in the end-point terminal, and transmit, the classified second data to the mobile communication terminal via the wireless local area network.

2. The system according to claim 1, wherein the second processor of mobile communication terminal is configured to classify third data executed in the mobile communication terminal, merge the classified third data with the classified second data transmitted from the end-point terminal, and transmit the merged data to the CPNS server.

3. The system according to claim 1, wherein the first processor of CPNS server is configured to classify the first data into third data required for both the mobile communication terminal and the end-point terminal, fourth data required to be transmitted to only the mobile communication terminal, and fifth data required to be transmitted to only the end-point terminal.

4. The system according to claim 1, wherein the third processor of end-point terminal is configured to classify the second data into third data allocated thereto and fourth data corresponding to both the mobile communication terminal and the end-point terminal when transmitting the second to the CPNS server via the mobile communication terminal.

5. A Converged Personal Network Service (CPNS) server connected to a mobile communication terminal via a mobile communication network in order to transmit game-related data to the mobile communication terminal and an end-point terminal executing a game through a wireless local area network, the CPNS server comprising:

a communication interface configured to communicate with the mobile communication terminal via the mobile communication network;

a contents request unit configured to request a contents providing server to provide the game-related data, and receive the game-related data provided from the contents providing server;

a data classifying/processing unit configured to classify the received game-related data into first data required for both the mobile communication terminal and the end-point terminal, second data required to be transmitted to only the mobile communication terminal, and third data required to be transmitted to only the end-point terminal;

a data transmitter configured to transmit the classified game-related data to the mobile communication terminal through the communication interface and over the mobile communication network; and a database configured to store information about the mobile communication terminal, information about the end-point terminal and information about the CPNS server.

6. The CPNS server according to claim 5, further comprising a mobile communication terminal information manager configured to register the information about the mobile communication terminal communicating with the end-point terminal through the wireless local area network in the database and manage the information.

7. The CPNS server according to claim 5, further comprising an end-point terminal information manager configured to register the information about the end-point terminal transmitting/receiving information to/from the mobile communication terminal through the wireless local area network in the database and manage the information.

8. A mobile communication terminal including a processor, the mobile communication terminal connected to a Converged Personal Network Service (CPNS) server via a mobile communication network and an end-point terminal via a wireless local area network to selectively receive game-related data transmitted from the CPNS server, said processor configured to:

receive the game-related data transmitted from the CPNS server via the mobile communication network;

extract only first game-related data destined for the mobile communication terminal from the received game-related data classified by destinations corresponding to the mobile communication terminal and the end-point terminal; and transmit second game-related data destined for the end-point terminal among the received game-related data classified by destinations corresponding to the mobile communication terminal and the end-point terminal, to the end-point terminal via the wireless local area network.

9. The mobile communication terminal according to claim 8, wherein said processor is configured to, classify first data executed in the mobile communication terminal, when second data executed in the end-point terminal is received from the end-point terminal via the wireless local area network, merge the classified first data with the received second data, and transmit the merged data to the CPNS server via the mobile communication network.

10. An end-point terminal including an input unit, a communication interface, a storage unit and a processor, for transmitting/receiving data to/from a mobile communication terminal while executing a game with the mobile communication terminal through a wireless local area network, said processor configured to:

receive a signal according to a user's choice through the input unit;

receive game-related data transmitted from the mobile communication terminal through the communication interface via the wireless local area network;

execute the game with the received game-related data;

classify data executed in the game in order to transmit, through the mobile communication terminal, the executed data to a Converged Personal Network Service (CPNS) server, the CPNS server providing the received game-related data, and transmit the classified data to the mobile communication unit through the communication interface via the wireless local area network;

store information about the end-point terminal.

11. A method for efficiently transmitting data during a game in a system including a Converged Personal Network Service (CPNS) server including a first processor, a mobile communication terminal including a second processor, and an end-point terminal including a third processor, the method comprising:

a step (a) in which the first processor of the CPNS server
classifies and processes first data in order to respectively transmit only required game-related data to the mobile communication terminal and the end-point terminal, which execute the game through a wireless local area network, and
transmits the classified game-related data to the mobile communication terminal via a mobile communication network;

a step (b), in which the second processor of the mobile communication terminal
receives the classified game-related data via the mobile communication network,
extracts game-related data allocated thereto from the classified game-related data transmitted from the CPNS server and
transmits game-related data destined for the end-point terminal to the end-point terminal via the wireless local area network; and a step (c) in which the third processor of the end-point terminal
executes the game-related data transmitted from the mobile communication terminal via the wireless local area network.

12. The method according to claim 11, further comprising:

a step (d) in which the third processor of the end-point terminal
classifies and processes first data executed in the end-point terminal, and
transmits the classified first data to the mobile communication terminal in order to transmit the classified first data to the CPNS server; and a step (e) in which the second processor of the mobile communication terminal
classifies second data executed in the mobile communication terminal,
merges the classified second data with the classified first data transmitted from the end-point terminal via the wireless local area network and
transmits the merged data to the CPNS server via the mobile communication network.

13. The system according to claim 2, wherein the first processor of the CPNS server is configured to classify the first data into fourth data required for both the mobile communication terminal and the end-point terminal, fifth data required to be transmitted to only the mobile communication terminal, and sixth data required to be transmitted to only the end-point terminal.

14. The system according to claim 2, wherein the third processor of the end-point terminal is configured to classify the second data into the fourth data allocated thereto and fifth data corresponding to both the mobile communication terminal and the end-point terminal when transmitting the second data to the CPNS server through the mobile communication terminal via the wireless local area network.

15. The CPNS server according to claim 6, further comprising an end-point terminal information manager configured to register the information about the end-point terminal transmitting/receiving information to/from the mobile communication terminal through the wireless local area network in the database and manage the information.

* * * * *